(12) United States Patent  
Baniak et al.

(10) Patent No.: US 6,516,929 B1
(45) Date of Patent: Feb. 11, 2003

(54) SELF-RELEASING CLUTCH ASSEMBLY FOR A VEHICLE DOOR LOCK

(75) Inventors: Grzegorz Baniak, Etobicoke (CA); Gregory A. Jorgensen, Oxford, MI (US)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/744,386

(22) PCT Filed: Jul. 20, 1999

(86) PCT No.: PCT/CA99/00654
§ 371 (c)(1),
(2), (4) Date: Jan. 23, 2001

(87) PCT Pub. No.: WO00/05467
PCT Pub. Date: Feb. 3, 2000

Related U.S. Application Data

(60) Provisional application No. 60/093,858, filed on Jul. 23, 1998.

(51) Int. Cl.⁷ .............................................. F16D 15/00
(52) U.S. Cl. ..................................... 192/38; 192/54.52
(58) Field of Search ............................... 192/38, 54.52, 192/71

(56) References Cited

U.S. PATENT DOCUMENTS 4,667,767 A * 5/1987 Shea et al. ................. 180/247
5,036,939 A * 8/1991 Johnson et al. ............ 180/223

FOREIGN PATENT DOCUMENTS

JP 3-153950 A * 7/1991 ................ 192/38

* cited by examiner

Primary Examiner—Richard M. Lorence
(74) Attorney, Agent, or Firm—Clark Hill PLC

(57) ABSTRACT

A self-releasing clutch assembly for locking a vehicle door lock. The clutch assembly (11) includes a servo-actuated input drive and a cinching output drive. A gear shaped first actuator (42) is mounted to the input drive. A cylindrical second actuator (44) is mounted to the output drive and is moveable relative to the first actuator. Four pairs of rollers (50) are interdisposed between the first and second actuators and moveable between a disengaged position and an engaged position. With the disengaged position, the rollers rest against the first actuator and allowing the second actuator to rotate relative thereto. With the engaged position, the rollers interlock the first and second actuators for relative concurrent movement. The clutch assembly is characterized by the first actuator including four driving surfaces (43) and the second actuator including four corresponding abutments (48). The driving surfaces engage and move the rollers from the disengaged position to the engaged position in response to movement by the input drive. The abutments then lock the rollers between the first and second actuators to couple the input drive with the output drive thereby transferring the movement of the input drive to the output drive. The subject invention also includes a biasing device (54) for automatically returning the rollers to the disengaged position when the driving force from the first actuator ceases.

16 Claims, 4 Drawing Sheets

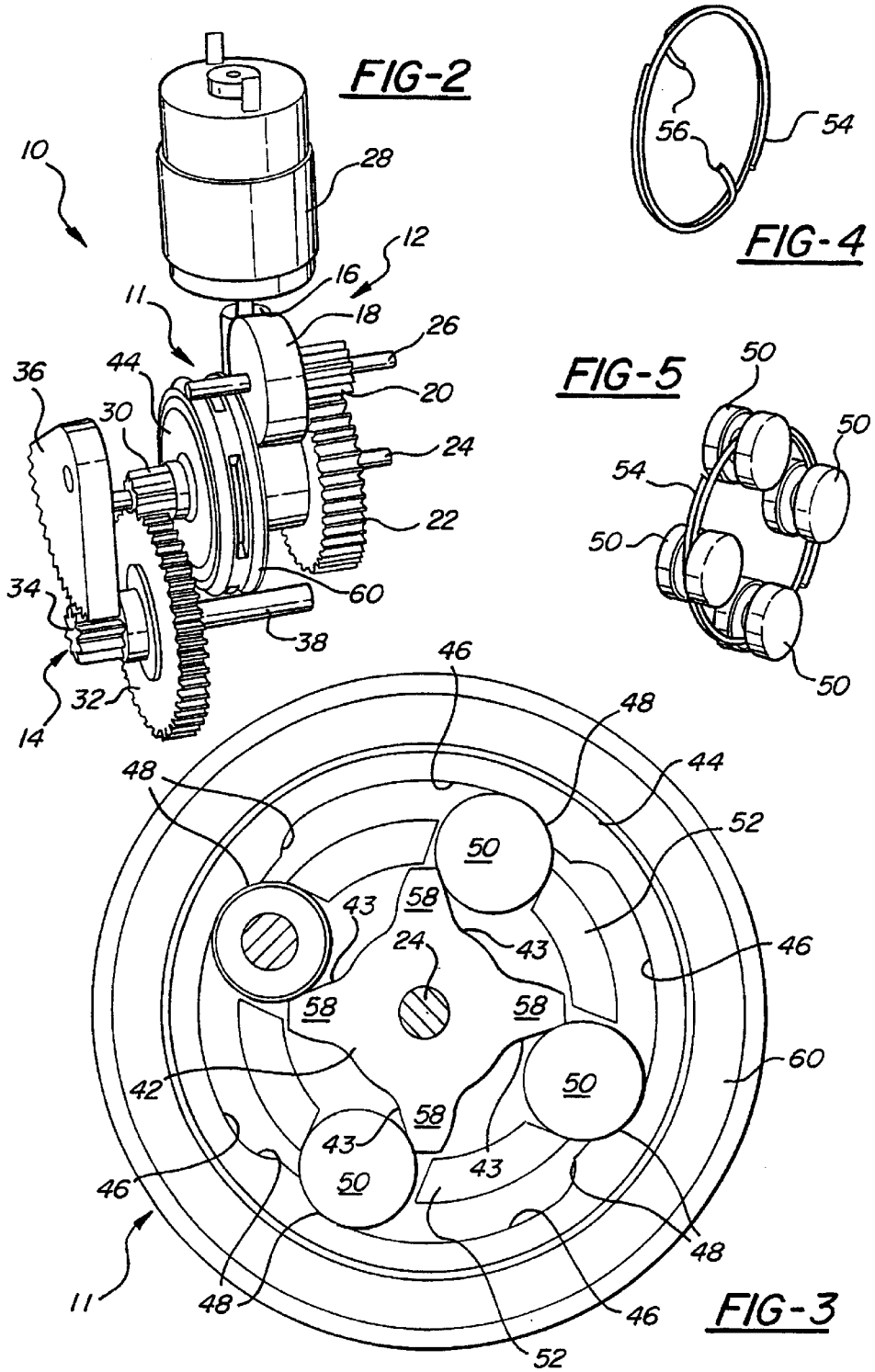

SELF-RELEASING CLUTCH ASSEMBLY FOR A VEHICLE DOOR LOCK

This application claims the benefit of provisional application No. 60/093,858, filed Jul. 23, 1998.

FIELD OF THE INVENTION

The subject invention relates to a clutch assembly for a vehicle door latch.

BACKGROUND OF INVENTION

Power sliding doors for mini-van type vehicles are becoming more popular and can be frequently purchased as an option. The sliding door has a main drive which drives the door between an open position and a generally closed or secondary latched position. The sliding door is also provided with a cinching servo-actuator for cinching the door from the secondary latched position to a primary latched position. In the primary latched position, the door is firmly closed against a seal which extends about the perimeter of the door and door opening.

Due to the size and mass of a typical sliding door, the force required to cinch the door closed can be relatively high. The servo-actuators must be highly geared to provide the requisite force using a motor of minimum size. The servo-actuator drivingly rotates a door latch from the secondary latched position to the primary latched position. Once the door latch has reached the primary latched position, the driving engagement between the servo-actuator and the latch must be released such that the latch may be electronically or manually released for opening the door.

U.S. Pat. No. 5,249,657 discloses a motor operated clutch members set in slide recess. A spring biases the clutch members to disengage upon relaeasing a driving rotation and a second spring biases the spring lever. U.S. Pat. No. 5,249,657 addresses problems which exist in attaching the clutch members to the spring.

SUMMARY OF THE INVENTION

A self-releasing clutch assembly comprising an input drive mechanism and an output drive mechanism is selectively engaged with the input drive mechanism. A first actuator is mounted to the input drive mechanism. A second actuator is mounted to the output drive mechanism and is moveable relative to the first actuator. A plurality of couplers are interdisposed between the first and second actuators and moveable between a disengaged position, with the couplers resting against one of the first and second actuators and allowing the other of the first and second actuators to rotate relative thereto, and an engaged position with the couplers interlocking the first and second actuators for relative concurrent movement. The clutch assembly is characterized by one of the first and second actuators including a plurality of driving surfaces and the other actuator including a plurality of abutments. The driving surfaces selectively move the couplers from the disengaged position to the engaged position in response to movement by the input drive mechanism and the abutments lock the couplers between the first and second actuators to couple the input drive mechanism with the output drive mechanism thereby transferring the movement of the input drive mechanism to the output drive mechanism. A single blasing device encircles the couplers for continuously biasing the couplers into the disengaged position with the couplers resting against one of the first and second actuators such that the biasing device automatically disengages the couplers from the abutments when the movement of the input drive mechanism ceases.

Accordingly, the subject invention provides a clutch or cinching assembly which selectively locks an input drive with an output drive to move a latch of a door lock. The clutch assembly the automatically disengages the input and output drives such that the door lock may be manually or electronically opened.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of door lock mechanism of FIG. 1 from a reverse angle;

FIG. 3 is a partially cross-sectional plan view of the clutch assembly;

FIG. 4 is a perspective view of a biasing device of the clutch assembly;

FIG. 5 is a perspective view of a plurality of couplers and the biasing device of the clutch assembly;

DETAILED DESCRIPTION OF THE PREFERRED EMBODIMENT

Figure 1:
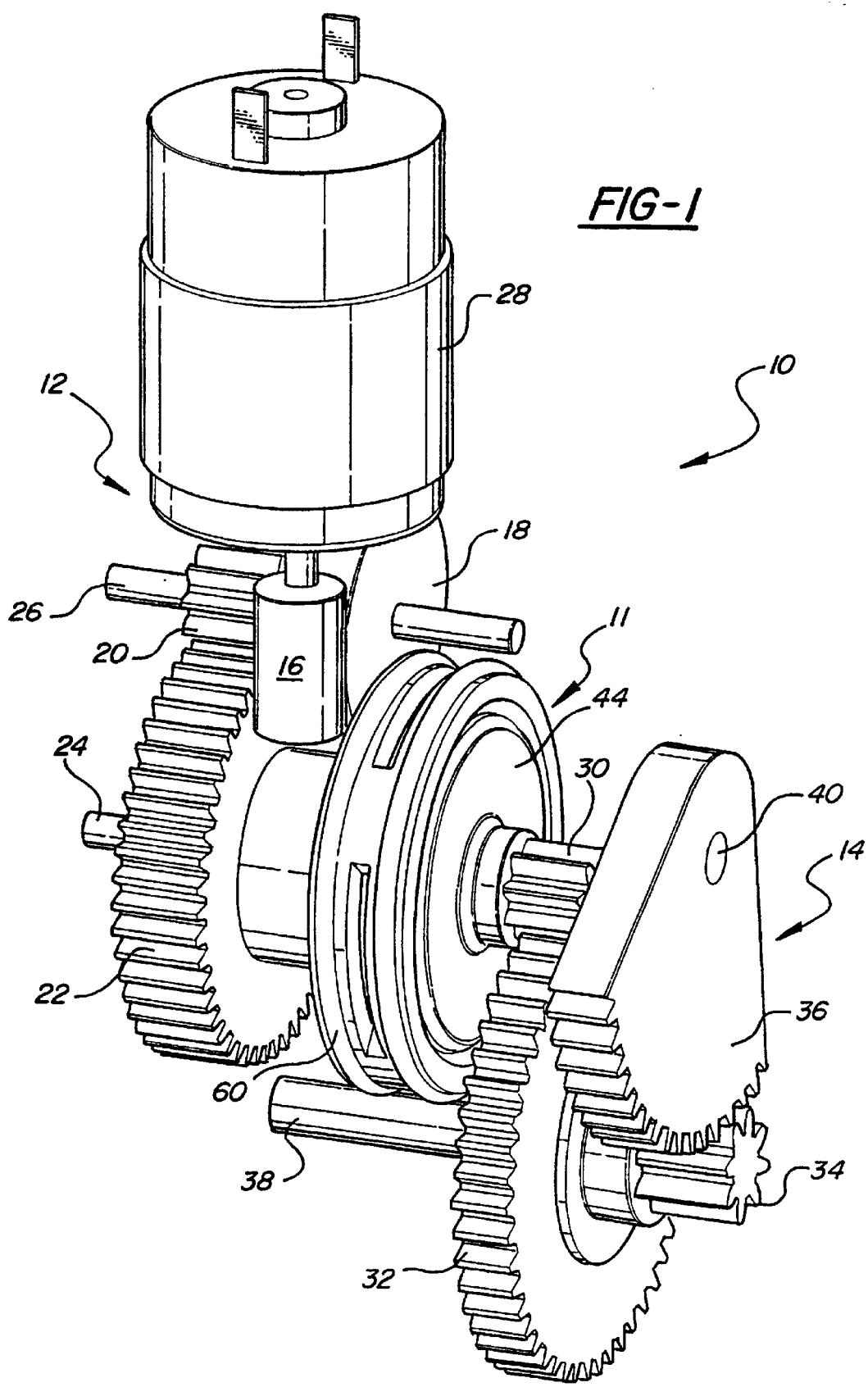
FIG. 1 is a perspective view of a vehicle door lock mechanism incorporating a self-releasing clutch assembly of the subject invention.

Referring to the Figures, wherein like numerals indicate like or corresponding parts throughout the several views, a vehicle door lock mechanism is generally shown at 10 in FIGS. 1 and 2. The door lock mechanism 10 is designed to cinch a door latch on a vehicle door. The door lock mechanism 10 is illustrated without reference to the latch or the door. However, it is readily apparent to those skilled in the art that the door lock mechanism 10 is mounted in a suitable housing either adjacent to or incorporated with a conventional latch. The conventional latch has a rotatably mounted ratchet engaging a pawl in a ratchet relation. The ratchet cooperates with a mouth of the housing to pivot between an open and closed condition for receiving, engaging and cinching a striker of a door. The pawl retains the ratchet in the closed and cinched conditions.

The door lock mechanism 10 includes a self-releasing clutch assembly, generally shown at 11, of the subject invention. The clutch assembly 11 comprises an input drive mechanism, generally shown at 12, and an output drive mechanism, generally shown at 14, selectively engaged with the input drive mechanism 12. Preferably, the input drive mechanism 12 is a servo-actuator having a plurality of driving gears 16, 18, 20, 22 and the output drive mechanism 14 is a cinching drive having a plurality of driven gears 30, 32, 34, 36. For illustrative purposes, some of the gears, such as driving gears 16 and 18, are shown schematically. As appreciated, the driving 16–22 and driven 30–36 gears may be of any suitable size, shaped or configuration.

As shown, the input drive mechanism 12 comprises a series of suitably sized cooperating gears 16–22 mounted on axles 24, 26 for converting the rotation of a motor 28 to a rotation of the axles 24, 26. The axles 24, 26 are suitable mounted within the housing of the door lock mechanism 10 in a manner well known in the art. Preferably, gears 18, 20 are commonly mounted on axle 26. Similarly, as shown, the output drive mechanism 14 comprises a series of suitably sized cooperating gears 30–36 mounted on axles 38, 40. The axles 38, 40 are also suitably mounted within the housing of the door lock mechanism 10 in a manner well known in the art. Axle 40 is in driving relation with a cinching lever (not shown) on the latch for cinching the door or the like from a secondary latched position to a primary latched position. Gear 22, the clutch assembly 11 and gear 30 are commonly mounted on axle 24, also known as a coupling axle 24. Gears 32, 34 are commonly mounted on axle 38. As will be discussed in greater detail below, the clutch assembly 11 provides a self-releasing feature for the door lock mechanism 10 between the servo-actuator and the cinching drive.

Referring also to FIGS. 3 through 5, the clutch assembly 11 includes a first actuator 42 mounted to the input drive mechanism 12. The clutch assembly 11 also includes a second actuator 44 mounted to the output drive mechanism 14 and moveable relative to the first actuator 42. A plurality of couplers 50 are interdisposed between the first 42 and second 44 actuators and moveable between a disengaged position and an engaged position. With the couplers 50 in the disengaged position, the couplers 50 rest against one of the first 42 and second 44 actuators and allow the other of the first 42 and second 44 actuators to rotate relative thereto. With the couplers 50 in the engaged position, the couplers 50 interlock the first 42 and second 44 actuators for relative concurrent movement.

The clutch assembly 11 is characterized by one of the first 42 and second 44 actuators including a plurality of driving surfaces 43 and the other actuator 44, 42 including a plurality of abutments 48. The driving surfaces 43 selectively move the couplers 50 from the disengaged position to the engaged position in response to movement by the input drive mechanism 12 and the abutments 48 lock the couplers 50 between the first 42 and second 44 actuators to couple the input drive mechanism 12 with the output drive mechanism 14 thereby transferring the movement of the input drive mechanism 12 to the output drive mechanism 14. In other words, the couplers 50 are used to transfer movement from the motor 28 to the latch of the door lock mechanism 10.

A biasing device 54 engages the couplers 50 for continuously biasing the couplers 50 into the disengaged position with the couplers 50 resting against the one of the first 42 and second 44 actuators. Specifically, the biasing device 54 automatically disengages the couplers 50 from the abutments 48 when the movement of the input drive mechanism 12 ceases. As shown best in FIG. 4, the biasing device 54 is preferably a coiled spring 54 having at least two ends 56 extending in a substantially orthoginal direction toward the couplers 50. Preferably, the spring 54 continuously biases the couplers 50 inward toward the first actuator 42.

As best shown in FIG. 5, each of the couplers 50 comprises a pair of rollers 50. Preferably there are four pairs of rollers 50 spaced equally apart. Each pair of rollers 50 are commonly mounted to an axle (not numbered) in spaced relation to each other. The spring 54 rides along each of the axles of the rollers 50 to bias the rollers 50 inward and the ends 56 of the spring 54 engage the axles of the rollers 50. A race ring 52 is interdisposed between the couplers 50 for providing a support surface for the spring 54 and equally spacing the rollers 50.

Referring back to FIG. 3, the first 42 and second 44 actuators of the clutch assembly 11 are now discussed in greater detail. Preferably, the first actuator 42 includes the driving surfaces 43 and the second actuator 44 includes the abutments 48. As appreciated, the first 42 and second 44 actuators may be reversed such that the first actuator 42 includes the abutments 48 and the second actuator 44 includes the driving surfaces 43.

The driving surfaces 43 are disposed on a plurality of projecting fingers 58. Specifically, the first actuator 42 has a substantially gear like configuration defining the projecting fingers 58. In the preferred embodiment, the first actuator 42 includes four outwardly projecting fingers 58. The driving surfaces 43 on the fingers 58 are contoured in such a manner as to push the pairs of rollers 50 outwardly toward the second actuator 44 when the first actuator 42 is rotated. The first actuator 42 is fixedly mounted to the coupling axle 24 with the coupling axle 24 driven by the input drive mechanism 12. Hence, the first actuator 42 is in driving relation with the servo-actuator. The fingers 58 of the first actuator 42 are sized to rotate with the race ring 52 and simultaneously engage each of the couplers 50.

The second actuator 44 is a cylindrical drum 44 substantially surrounding the first actuator 42. In other words, the first actuator 42 nests within the second actuator 44 in a face to face relation defining an internal chamber (not numbered). The rollers 50, race ring 52 and spring 54 are positioned within this internal chamber between the first 42 and second 44 actuators. Preferably, the cylindrical drum 44 has an inner circumferential surface which includes four equally spaced grooves 46 defining the abutments 48. Even more preferably, the cylindrical drum 44 includes eight abutments 48. As discussed above and in the operation section, the abutments 48 are engaged by the rollers 50. The particular abutment 48 that is engaged will depend upon the direction of rotation for the first actuator 42. As appreciated, four abutments 48 will be engaged if the rotation is clockwise and an opposite four abutments 48 will be engaged if the rotation is counter-clockwise. The second actuator 44 is also supported by the coupling axle 24 and is in driving relation with gear 30. Hence, the second actuator 44 is in driving engagement with the cinching drive. The coupling axle 24 therefore supports one of the driving gears 16–22, the first actuator 42, the second actuator 44 and one of the driven gears 30–36. Although gears 22 and 30 and the first 42 and second 44 actuators are commonly mounted, the first actuator 42 is mounted to rotate relative to the second actuator 44.

An outer housing 60 surrounds the cylindrical drum 44 and is preferably mounted to the input drive mechanism 12. The outer housing 60 is also mounted to the first actuator 42 such that the outer housing 60 and the first actuator 42 move as a unitary part. As appreciated, the outer housing 60 may be mounted to the output drive mechanism 14, may spin freely about either drive mechanism 12, 14 or may be removed altogether.

Figure 6:
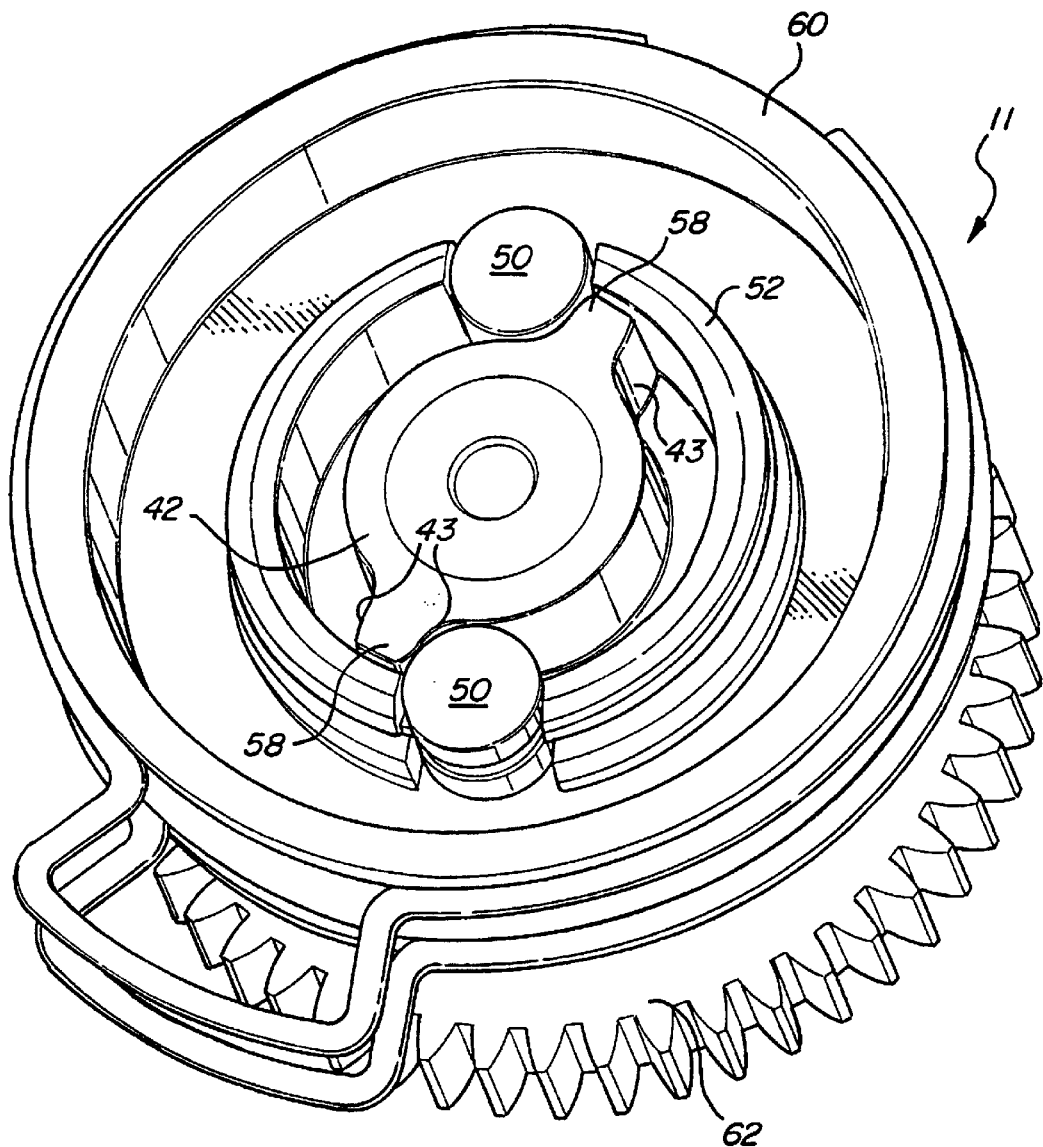
FIG. 6 is a perspective view of an alternative embodiment of the clutch assembly.
Figure 7:
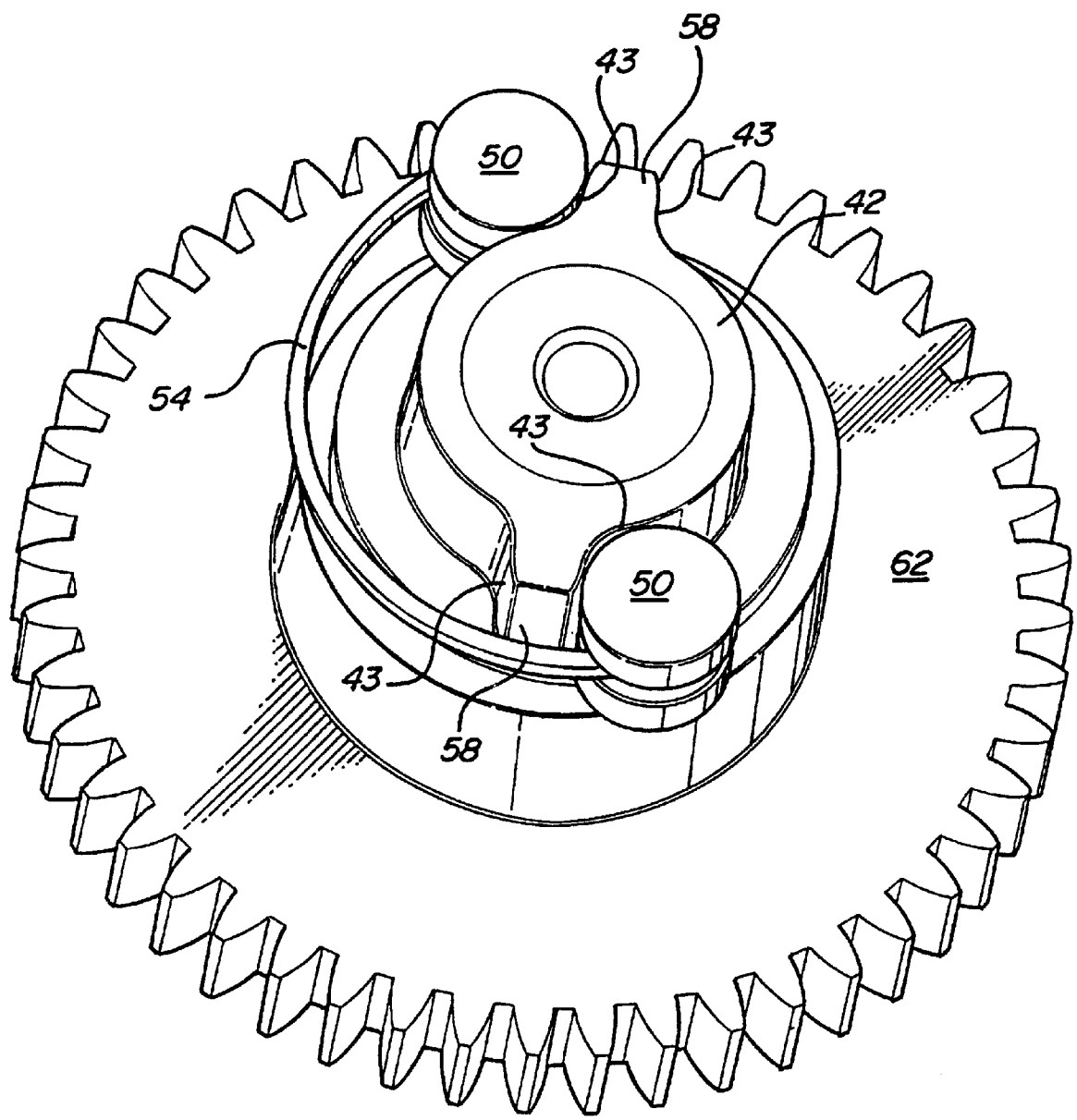
FIG. 7 is a perspective view of the alternative embodiment of the clutch assembly with an outer housing removed.

Referring to FIGS. 6 and 7, an alternative embodiment of the subject invention is shown wherein like numerals indicate like or corresponding parts. The first actuator 42 now includes two outwardly projecting fingers 58 for selectively engaging two pairs of rollers 50. The two pairs of rollers 50 are disposed at opposite ends thereof. The second actuator 44 is not illustrated. A gear 62 is mounted to an exterior surface of the outer housing 60 for providing a more direct engagement with the first actuator 42. Other aspects of this alternative embodiment are substantially identical to the preferred embodiment.

During operation of the door lock mechanism 10, an operator will close a door, window or the like until the latch of the door closes into a secondary position. The motor 28 will then be activated which moves the driving gears 16–22 of the servo-actuator. These gears 16–22 in turn rotate the coupling axle 24 which turns the first actuator 42. The first actuator 42 will rotate relative to the second actuator 44. The driving surfaces 43 of the fingers 58 of the first actuator 42 will correspondingly engage each of the pairs of rollers 50. The driving surfaces 43 then push each of the rollers 50 outwardly against the bias of the spring 54 until the rollers 50 engage a corresponding groove 46 within the second actuator 44. The race ring 52 maintains the proper positioning of the rollers 50.

Continuing rotation of the first actuator 42 now pushes the rollers 50 within the corresponding circumferential grooves 46 of the second actuator 44. A "lost motion" type engagement is created within the grooves 46. This movement will continue until the rollers 50 engage a corresponding abutment 48. As appreciated, the particular abutment 48 that is engaged will depend upon the direction of rotation. The rollers 50 are now wedged between a corresponding finger and an abutment 48. Further rotation of the first actuator 42 will now cause corresponding rotation of the second actuator 44. Rotation of the second actuator 44 rotates gear 30 and thus gears 32–36 of the cinching drive for cinching the door or the like from the secondary position to a primary closed position.

Once the latch has been cinched, the motor 28 is deactivated which releases the driving force to the servo-actuator and first actuator 42. The spring 54 now biases the pairs of rollers 50 inward against the first actuator 42 and out of engagement with the second actuator 44. This inward movement causes the first actuator 42 and servo-actuator to counter-rotate slightly. The rollers 50 are now out of engagement with the abutments 48 and the second actuator 44 can again rotate freely about the first actuator 42. This creates another "lost motion" connection. Hence, the gear 36 may be counter rotated when the latch is released without counter rotating the first actuator 42 and motor 28. The above steps for locking the door or the like can then be repeated.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A self-releasing clutch assembly (11) comprising;
   an input drive mechanism (12),
   an output drive mechanism (14) selectively engaged with said input device mechanism,
   a first actuator (42) mounted to said input drive mechanism (12),
   a second actuator (44) mounted to said out drive mechanism (14) and moveable relative to said first actuator (42), and
   a plurality of couplers (50) interdisposed between said first and second actuators (42,44) and moveable between a disengaged position with said couplers (50) resting against one of said first and second actuators and allowing the other of said first and second actuators to rotate relative thereto and an engaged position with said couplers interlocking said first and second actuators for relative concurrent movement,
   one of said first and second actuators including a plurality of driving surfaces (43) and said other actuator including a plurality of abutments (48), said driving surfaces (43) selectively moving said couplers (50) from said disengaged position to said engaged position in response to movement by said input drive mechanism (12) and said abutments (48) locking said couplers (50) between said first and second actuators to couple said input drive mechanism with said output drive mechanism thereby transferring said movement of said input drive mechanism to said output drive mechanism, said clutch assembly characterized by
   a coiled spring (54) encircling said couplers (50), said coiled spring having at least two ends extending in a substantially orthogonal direction toward said couplers (50) for continuously biasing said couplers into said disengaged position with said couplers resting against said one of said first and second actuators such that said coiled spring automatically disengages said couplers from said abutments when said movement of said input drive mechanism ceases.

2. An assembly as set forth in claim 1 further including a race ring (52) interdisposed between said couplers (50) and providing a support surface for said spring (54).

3. An assembly as set forth in claim 1 wherein each of said couplers (50) comprises a pair of rollers.

4. An assembly as set forth in claim 1 wherein said driving surfaces are disposed on a plurality of projecting fingers (58).

5. An assembly as set forth in claim 4 wherein said first actuator (42) includes said driving surfaces and said second actuator (44) includes said abutments.

6. An assembly as set forth in claim 5 wherein said first actuator includes four outwardly projecting fingers (58).

7. An assembly as set forth in claim 5 wherein said first actuator includes two outwardly projecting fingers (58).

8. An assembly as set forth in claim 5 wherein said second actuator (44) is a cylindrical drum substantially surrounding said first actuator (42).

9. An assembly as set forth in claim 8 wherein said cylindrical drum (44) has an inner surface which includes four equally spaced grooves defining said abutments (48).

10. An assembly as set forth in claim 9 wherein said cylindrical drum (44) includes eight abutments (48).

11. An assembly as set forth in claim 9 further including an outer housing (60) surrounding said cylindrical drum and mounted to said input drive mechanism (12).

12. An assembly as set forth in claim 11 wherein said outer housing (60) is mounted to said first actuator such that said outer housing and said first actuator move as a unitary part.

13. An assembly as set forth in claim 12 further including a gear mounted to an exterior surface of said outer housing (60).

14. An assembly as set forth in claim 9 wherein said input drive mechanism includes a plurality of driving gears (16, 18, 20, 22) and said output drive mechanism includes a plurality of driven gears (30, 32, 34, 36).

15. An assembly as set forth in claim 14 wherein said first actuator is fixedly mounted to a coupling axle (24) with said coupling axle driven by said input drive mechanism.

16. An assembly as set forth in claim 15 wherein said coupling axle (24) supports one of said driving gears, said first actuator, said second actuator and one of said driven gears.

* * * * *

UNITED STATES PATENT AND TRADEMARK OFFICE
CERTIFICATE OF CORRECTION

PATENT NO.    : 6,516,929 B1  
DATED         : February 11, 2003  
INVENTOR(S)   : Baniak et al.

It is certified that error appears in the above-identified patent and that said Letters Patent is hereby corrected as shown below:

Column 1,
Line 33, delete "a";
Line 34, insert -- a -- between "in" and "slide";
Line 35, delete "relaesing" and insert -- releasing -- therefor;
Line 64, delete "blasing" and insert -- biasing -- therefor;

Column 2,
Line 6, delete "the" between "assembly" and "automatically";
Line 20, insert -- the -- between "of" and "door";
Line 64, delete "shaped" and insert -- shape -- therefor;

Column 3,
Line 1, delete "suitable" and insert -- suitably -- therefor;

Column 5,
Line 56, delete "out" and insert -- output -- therefor.

Signed and Sealed this

Eighth Day of April, 2003

JAMES E. ROGAN  
*Director of the United States Patent and Trademark Office*